3,336,358
PREPARATION OF 2-AMINOETHYL ESTERS OF METHACRYLIC ACID
Russell T. McFadden, Freeport, Tex., assignor to The Dow Chemical Company, Midland, Mich., a corporation of Delaware
No Drawing. Filed July 23, 1964, Ser. No. 384,768
6 Claims. (Cl. 260—465.4)

This invention relates to a process for the preparation of aminoethyl esters of methacrylic acid and to a method of separating such esters from other materials. More particularly, the present invention relates to the preparation of aminoethyl esters of methacrylic acid (and the acid salts thereof) by reacting an aziridine compound with methacrylic acid in the presence of an aliphatic hydrocarbon solvent.

It is known that benzoic acid will react with ethylenimine in the presence of a halogen-containing solvent such as chloroform. Such a process is disclosed by Powers et al. in J. Amer. Chem. Soc., 78, pp. 907–911. This method, however, is not appropriate for the production of aminoethyl esters of methacrylic acid because a single phase reaction mixture results, and the product is not easily separated. Other conventional methods for the preparation of aminoethyl esters of methacrylic acid have similar disadvantages. Thus, the ester exchange reaction of β-dimethylaminoethanol and methyl methacrylate to produce β-dimethylaminoethyl methacrylate requires the distillation of a binary mixture as disclosed by Graves in U.S. 2,138,763.

According to the process of the invention, a two-phase mixture comprising (a) the desired ester reaction product in its salt form (usually contaminated with unreacted methacrylic acid) and (b) the solvent is obtained using an aliphatic hydrocarbon solvent in the presence of an acid capable of forming an amine salt (preferably a mineral acid). Under these conditions, the ester product may be physically separated in its salt form from the remainder of the reaction products. The ester is then merely washed to remove residual unreacted methacrylic acid (and/or other contaminants) in order to obtain a substantially pure product. Thus, an aminoethyl ester of methacrylic acid may be separated from a mixture or solution by contacting the mixture or solution with an acid in the presence of an aliphatic hydrocarbon to form the acid salt of the ester in a separate physical phase, and then removing the acid salt from the resulting two-phase mixture.

Although the separation and purification of the esters in their salt forms are independent of the method by which the esters are initially prepared, the reactions by which the esters (and subsequently, their acid salts) are ordinarily produced are represented by the following equations:

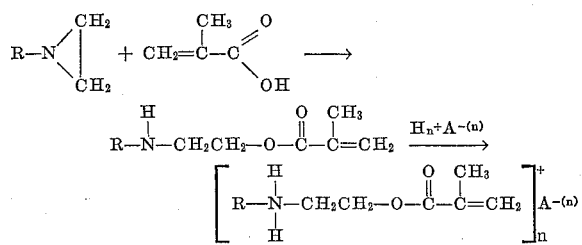

wherein R is selected from the group consisting of the hydrogen atom, an alkyl group of from 1 to 6 carbon atoms, an aralkyl group of from 7 to 12 carbon atoms, a cyanoalkyl group of from 2 to 6 carbon atoms and a hydroxyalkyl group of from 1 to 6 carbon atoms, and wherein $A^-$ is the anion of a mineral acid with a valence $n$ of 1 to 3. Suitable R groups include methyl, ethyl, n-propyl, i-propyl, n-butyl, i-butyl, sec.-butyl, tert.-butyl, neopentyl, n-pentyl, i-pentyl, n-hexyl, i-hexyl, 2-hydroxyethyl, 3-hydroxybutyl, 2-hydroxyhexyl, 5-hydroxypentyl, benzyl, phenethyl, 3-(p-tolyl)pentyl, 2-cyanoethyl, 3-cyanopropyl, 4-cyanobutyl and 2-cyanopentyl groups. Aziridine compounds containing no more than 25 carbon atoms are preferred reactants. Typical anions include the sulfate, chloride, bromide, phosphate and nitrate groups which are derived from the corresponding acids.

Typical aliphatic hydrocarbon solvents which may be employed to obtain phase separation of the reaction mixture include non-aromatic kerosene fractions (distillation range from about 100° to 300° C.), n-hexane, n-heptane, cyclohexane, n-pentane, i-pentane and unreactive olefins such as hexene-1, 2-heptene, etc. as well as mixtures of such solvents. In general, any liquid aliphatic hydrocarbon may be used, and aliphatic hydrocarbons of no more than about 12 carbon atoms are preferred. These compounds (non-aromatic hydrocarbons) are relatively poor solvents for the salt form of the product so that (1) they keep free methacrylic acid in solution, (2) they keep the intermediate aziridinyl compound/methacrylic reaction product in solution, but (3) on addition of an acid to form the amine salts, they immediately precipitate the product in a more or less pure and isolatable form. Other solvents do not have these properties in the presence of the excess methacrylic acid generally used to obtain good yields.

The compounds prepared by the process of the invention are useful as curing agents for epoxy resins (especially epoxy resins based upon Bisphenol-A). Typical epoxy resins which may be cured using the compounds prepared by the process of the present invention are disclosed on pages 750–751 of "Chemistry of Organic Compounds," 2nd ed., by Noller. The compounds are added to the epoxy resin in amounts sufficient to provide at least one active hydrogen atom (or C═C linkage) for each epoxy group in the resin. Amounts of from 10 to 50 percent (based upon the total weight of the cured polymer) may be used when the epoxy resin is the reaction product of equimolar amounts of epichlorohydrin and Bisphenol-A in the presence of a base. The polymers may be used in forming coatings, laminates and adhesives. In addition, the compounds can be polymerized (or copolymerized with other acrylates) to form useful plastic materials and adhesives.

A preferred embodiment of the process of the invention comprises slowly adding an aziridine compound to a mixture of methacrylic acid (mole ratio of total amounts of methacrylic acid compound to aziridine compound of at least 1:1 and preferably from 1.5–2.0:1 to about 20:1) in an aliphatic hydrocarbon solvent at a temperature of from about −15 to 150° C. (preferably from 0° to 100° C.) over a period of from ¼ hour to 5 hours (preferably about ½ hour to 3 hours). Upon completion of the addition of the aziridine compound, a mineral acid (such as HCl, $H_2SO_4$ or $H_3PO_4$) is slowly added to the reaction mixture until a slight excess of acid is present (as determined by a sharp drop in pH measured with a pH meter or chemical indicators). Excess acid may be used, but only a stoichiometric amount is generally employed. Agitation of the mixture is then stopped and the aminoethyl methacrylate salt settles to the bottom of the mixture as a separate phase (either a viscous oil or a crystalline solid, depending upon the particular ester salt produced). This bottom phase is then removed by conventional physical separation methods and either used without purification, or else washed with a solvent (such as acetone, methyl ethyl ketone or other carbonylic organic solvent) to remove any unreacted methacrylic acid. It has been found that the best yields are obtained when the final mole ratio (after complete addition of the aziridine compound) of methacrylic acid to aziridine compound is from about 4:1 to 10:1. During the course of the reaction, very high (more than 1000:1) mole ratios of methacrylic acid: aziridine compound may be used.

The following examples are submitted for the purpose of illustration only and are not to be construed as limiting the scope of the invention in any way.

*Example I*

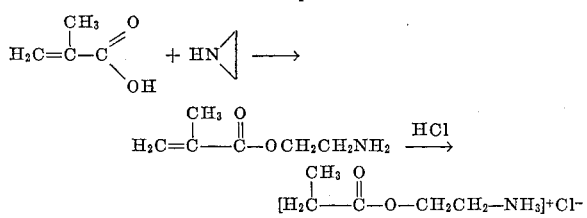

Into a five-necked, 2 liter glass reaction vessel equipped for stirring, purging, temperature control, refluxing and continuous addition of reactants, was added 516 grams (6 moles) of glacial methacrylic acid, 516 grams of pure n-hexane and 0.516 gram of paramethoxyphenol (as a polymerization inhibitor). The temperature was raised to 60° C. with stirring and 64.5 grams (1.5 moles) of pure ethylenimine was added dropwise over a period of 1½ to 2 hours. The mixture was then cooled to 30° C. and anhydrous hydrogen chloride was bubbled in until a slight excess was present. Stirring was stopped and the two phases were allowed to separate. The lower phase weighed 388 grams and consisted of 1.4 percent (by weight) free HCl, 33 percent methacrylic acid and 52.6 percent aminoethyl methacrylate hydrochloride. This was a yield of 83 percent based on the ethylenimine charged. The balance of the crude product was hexane and other amine hydrochlorides. Yields in pilot plant operations have exceeded 90 percent of theory.

One hundred parts of the crude product from above was washed with 100 parts of n-hexane to remove the residual methacrylic acid. The extract may be readily fractionally distilled and both the hexane and methacrylic acid recovered for reuse. The concentrated crude product from the first wash was washed again with an equal quantity of acetone (80–85 parts). The product was then dried under vacuum at 20 millimeters mercury and 25° C. The dried product was analyzed as follows:

|  | Analysis (Percent by Weight) | |
|---|---|---|
|  | Actual | Theory ($C_5H_{12}NO_2Cl$) |
| C=C | 14.2 | 14.5 |
| Cl | 21.5 | 21.4 |
| N | 8.56 | 8.46 |

The structure was confirmed by infrared spectroscopy.

*Example II*

The same procedure and equipment as in Example I was used except that the ethylenimine was added at −5° C. over a 1½ hour period. Upon completion of the addition of the ethylenimine, the reaction mixture was warmed to 25° C. and dry HCl was bubbled in as before. After phase separation, the crude product weighed 353 grams and consisted of 0.9 percent free HCl, 34 percent unreacted methacrylic acid and 48.1 percent aminoethyl methacrylate hydrochloride. This was a 68.4 percent yield based on ethylenimine.

*Example III*

The same procedure and equipment as in Example I was used except that the ethylenimine was added at 30°–35° C. over a period of 1½ hours. Upon completion of the ethylenimine addition, the temperature was reduced to 25° C. and dry HCl was bubbled in as in the previous examples. After phase separation, the crude product weighed 398 grams and contained 1.2 percent free HCl, 34 percent methacrylic acid and 47.7 percent aminoethyl methacrylate hydrochloride. This was a yield of 77 percent based on ethylenimine.

*Example IV*

The same procedure and equipment as in Example I was used except that the ethylenimine was added over a period of 20 minutes. After cooling and HCl addition, the product weighed 340 grams and contained 1.1 percent free HCl, 35.6 percent methacrylic acid and 48.9 percent aminoethyl methacrylate hydrochloride. This was a yield of 77 percent based on ethylenimine. The unreacted methacrylic acid was easily removed by washing with n-hexane and then acetone.

*Example V*

The same procedure and equipment as in Example I was used except that the ethylenimine was added over a period of 8 hours. The product weighed 381 grams and contained 0.5 percent free HCl, 31 percent methacrylic acid and 51.1 percent aminoethyl methacrylate hydrochloride. The yield was 78 percent based on ethylenimine.

*Example VI*

The same procedure and equipment as in Example I was used except that the mole ratios of methacrylic acid (MAA) to ethylenimine (EI) were varied. The results of several runs are given in Table 1, below.

TABLE I

| Mole Ratio MAA/EI | Wt. of Crude Product (Grams) | Weight Percent of AEM·HCl* in Crude Product | Percent Yield of AEM·HCl Based on Ethylenimine |
|---|---|---|---|
| 2/1 | 424 | 38 | 65 |
| 3/1 | 414 | 45 | 75 |
| 4/1 | 388 | 56 | 83 |
| 10/1 | 384 | 55 | 85 |

*AEM = aminoethyl methacrylate.

The lower than theoretical yields here are due in part to mechanical losses in trying to remove and transfer viscous adherent compositions from laboratory glassware. When these mechanical losses are eliminated, the use of, for example, a 10/1 molar ratio gives yields which approach 100 percent of theoretical titratable amine hydrochloride, indicating an overall yield of AEM·HCl of from 90 to 95 percent of theory.

*Example VII*

The same procedure and equipment as in Example I was used except that various solvents were employed in the place of the n-hexane. The results of these runs are presented in Table 2, below.

TABLE 2

| Solvent | Result |
|---|---|
| Kerosene (non-aromatic). Boiling range 100° to 300° C. | Good phase separation with a good clear precipitate. 84 percent yield of AEM·HCl based on ethylenimine. |
| 1,2-dichloroethane | No phase separation. |
| Chloroform | Do. |
| Methyl methacrylate | Do. |
| Acetone | Do. |
| Toluene | Do. |
| Ethanol | Do. |

*Example VIII*

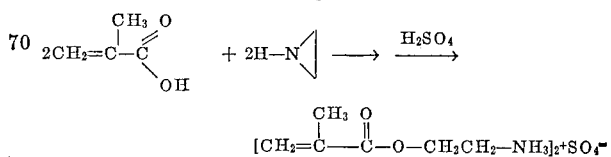

The same procedure and equipment as in Example I was used except that concentrated (96 percent by weight) sulfuric acid was substituted for dry HCl and was added dropwise over a period of 45 minutes. A normal phase separation occurred and the crude product analyzed 42.8 percent methacrylic acid and 40.6 percent 2-aminoethyl methacrylate sulfate. The yield based on ethylenimine was 82 percent.

*Example IX*

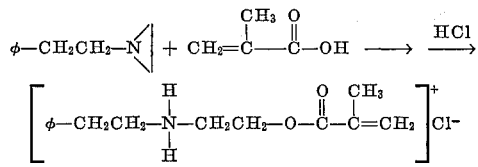

Using the procedure and equipment of Example I, 147 grams of N-phenethyl aziridine (1 mole) was reacted with 387 grams of methacrylic acid in 387 grams of n-hexane. The addition of dry hydrogen chloride resulted in a precipitate of N-phenethyl-2-aminoethyl methacrylate hydrochloride. Filtration yielded 240 grams of 90 percent pure product which was pale yellow in color. One wash with 240 grams of acetone yielded 190 grams of 99 percent pure white dry powder. The yield based on N-phenethyl ethylenimine was 70 percent.

*Example X*

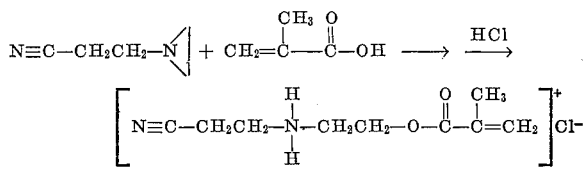

Using a procedure similar to that of Example IX, but with 1 mole of N-cyanoethyl aziridine instead of N-phenethyl aziridine, gave 140 grams of 99 percent pure N-cyanoethyl-2-aminoethyl methacrylate hydrochloride. This was a yield of 64 percent based on N-cyanoethyl-aziridine.

I claim as my invention:

1. A method of separating the mineral acid salt of an aminoethyl ester of methacrylic acid which comprises contacting a solution in a saturated or mono-olefinic, aliphatic hydrocarbon solvent of an aminoethyl ester of methacrylic acid having the formula

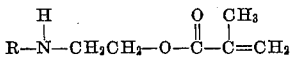

wherein R is hydrogen, an alkyl group of from 1 to 6 carbon atoms, an aralkyl group of from 7 to 12 carbon atoms, a cyanoalkyl group of from 2 to 6 carbon atoms, or a hydroxyalkyl group of from 1 to 6 carbon atoms, with a mineral acid to form the mineral acid salt of said ester in a separate physical phase, and then removing the mineral acid salt.

2. A method of preparing the mineral acid salt of an aminoethyl ester of methacrylic acid which comprises reacting, in a mole ratio of from about 1.5:1 to 10:1, at a temperature of from 0° to 100° C., for a time of from ¼ hour to 5 hours, methacrylic acid and an aziridine compound of the formula

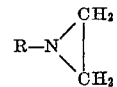

wherein R is selected from the group consisting of the hydrogen atom and a monovalent organic group of no more than about 12 carbon atoms selected from the group consisting of an alkyl, aralkyl, cyanoalkyl and a hydroxyalkyl group in the presence of a saturated or mono-olefinic, aliphatic hydrocarbon solvent of up to about 12 carbon atoms, contacting the resulting reaction mixture with a mineral acid to form the mineral acid salt of said aminoethyl ester in a separate physical form, and then removing said mineral acid salt.

3. A method of preparing 2-aminoethyl methacrylate hyrdochloride which comprises reacting methacrylic acid and ethylenimine in a mole ratio of from about 1.5:1 to 10:1, respectively, in the presence of n-hexane solvent at a temperature of from −15° to 150° C., and then adding HCl to the reaction mixture.

4. A method of preparing 2-aminoethyl methacrylate sulfate which comprises reacting methacrylic acid and ethylenimine in a mole ratio of from about 1.5:1 to 10:1, respectively, in the presence of n-hexane solvent at a temperature of from −15° to 150° C., and adding $H_2SO_4$ to the reaction mixture to form the sulfate product as a separate phase.

5. A method of preparing N-cyanoethyl-2-aminoethyl methacrylate hydrochloride which comprises reacting methacrylic acid with N-cyanoethyl aziridine in a mole ratio of from about 1.5:1 to 10:1, respectively, in the presence of n-hexane solvent at a temperature of from −15° to 150° C., and adding HCl to the reaction mixture to form the hydrochloride product as a separate phase.

6. A method of preparing N-phenethyl-2-aminoethyl methacrylate hydrochloride which comprises reacting methacrylic acid and N-phenethyl aziridine in a mole ratio of from about 4:1 to 10:1, respectively, in the presence of n-hexane solvent at a temperature of from 40° to 70° C., treating the reaction mixture with HCl to form the hydrochloride product, and separating said hydrochloride product from the mixture.

References Cited

UNITED STATES PATENTS

| | | | |
|---|---|---|---|
| 2,158,239 | 5/1939 | Lott | 260—486 X |
| 2,251,946 | 8/1941 | Lott | 260—486 X |
| 2,310,973 | 2/1943 | Lott | 260—486 X |

OTHER REFERENCES

Richter: "Textbook of Organic Chemistry," third edition, 1952, page 246.

CHARLES B. PARKER, *Primary Examiner.*

JOSEPH P. BRUST, *Examiner.*